May 6, 1930.    W. A. STARCK    1,757,749

AUTOMOBILE BUMPER

Original Filed Feb. 8, 1928

Inventor:
William A. Starck,
By Edwin B. H. Towne, Jr.
Atty.

Patented May 6, 1930

1,757,749

UNITED STATES PATENT OFFICE

WILLIAM A. STARCK, OF MILWAUKEE, WISCONSIN, ASSIGNOR TO BADGER MANUFACTURING CORPORATION, OF MILWAUKEE, WISCONSIN, A CORPORATION OF DELAWARE

AUTOMOBILE BUMPER

Original application filed February 8, 1928, Serial No. 252,815. Divided and this application filed May 29, 1929. Serial No. 366,926.

This invention relates to automobile bumpers.

The bumper to which the invention applies in particular is disclosed in my co-pending application, Serial No. 252,815, filed February 8, 1928, of which this application is a division.

The object of the invention is to provide a bumper having a large capacity for absorbing shocks.

Another object is to provide a bumper in which a shock is progressively absorbed and distributed throughout the bumper.

Another object is to provide a bumper which may be readily and economically manufactured.

According to the invention as it is ordinarily embodied, the bumper has a spring impact bar connected at each end and intermediate each end and the central part thereof to a separate spring supporting bar, and a spring advance bar is arranged forwardly of the impact bar.

Figure 1:
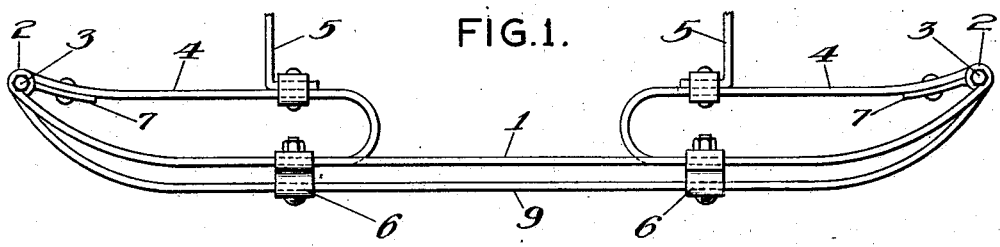
Figure 2:
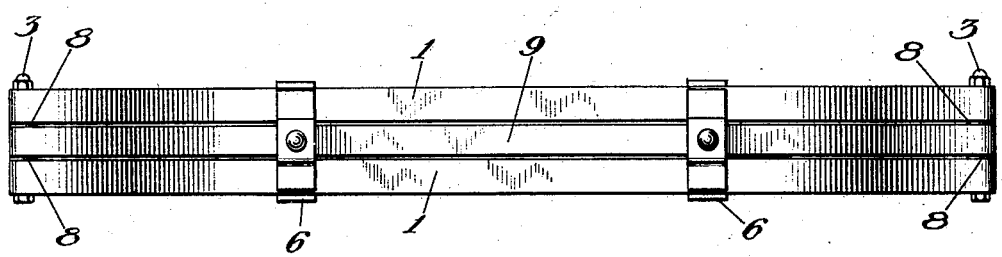
Figure 3:
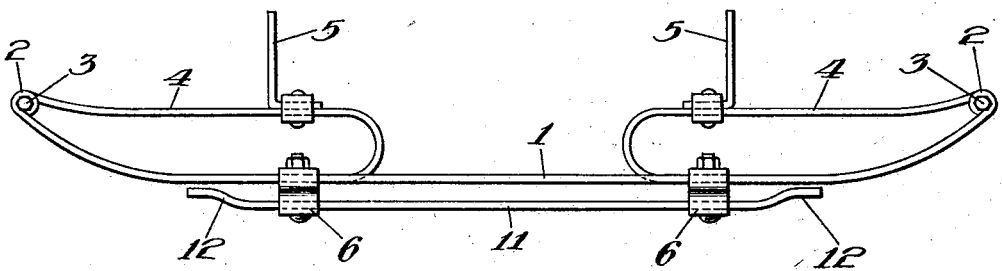
Figure 4:
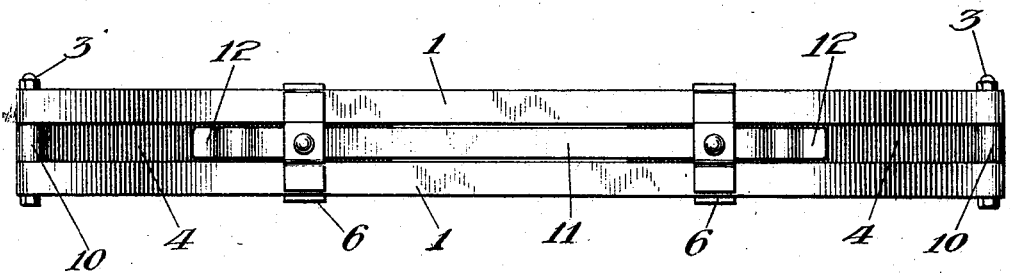

Bumpers embodying the invention are illustrated in the accompanying drawing in which the views are as follows:

Fig. 1 is a top plan view of a bumper.
Fig. 2 is a front view of the same.
Fig. 3 is a top plan view of another bumper.
Fig. 4 is a front view of the same.

Figs. 1 and 2

The bumper has parallel spring impact bars 1 provided at each end with eyes 2 to receive pins or pintles 3 which connect the impact bars to each other.

The impact bars 1 are supported at each end by a spring supporting bar 4 which carries a bracket 5 for attaching the bumper to an automobile.

Each supporting bar 4 has its outer end pivotally connected to the pin 3 and its inner end looped forwardly and outwardly, arranged between the impact bars 1, and connected thereto by a clamp 6.

The outer end of each supporting bar 4 may have a hinge plate 7 attached thereto and provided with apertured ears 8 to receive the pin 3.

A spring advance bar 9 is spaced forwardly from and connected to the impact bars 1 by the clamps 6 and has its ends pivotally connected to the pins 3 intermediate the ears 8.

Figs. 3 and 4

This bumper differs from the bumper shown in Figs. 1 and 2 in having eyes 10 formed on the outer ends of the supporting bars 4 to embrace the pins 3 and in having a spring advance bar 11 which is shorter than the bar 9 and provided with rearwardly offset ends 12.

The other parts of the bumper are the same as the corresponding parts of the bumper shown in Figs. 1 and 2 and have been indicated by the same reference numerals.

A light shock, received by the advance bar will be partially absorbed thereby and the unabsorbed portion transferred to the impact bars 1 and the supporting bars 4 through the clamps 6 or through the clamps 6 and pins 3.

A heavier shock will deflect the advance bar between the impact bars and permit the same to receive a portion thereof directly.

The invention herein set forth is susceptible of various modifications without departing from the scope thereof as hereafter claimed.

The invention is hereby claimed as follows:

1. An automobile bumper comprising an impact bar, separate spring supporting bars connected to said impact bar intermediate the ends and the center thereof and pivoted to said ends to support said bar, and an advance bar spaced forwardly from said impact bar.

2. An automobile bumper comprising parallel impact bars, separate spring supporting bars connected to said impact bars intermediate the ends and the center thereof and pivoted to said ends to support said bars, and an advance bar spaced forwardly from said impact bars.

3. An automobile bumper comprising an impact bar, separate spring supporting bars connected to said impact bar intermediate the ends and the center thereof and pivoted to said ends to support said bar, and an advance bar spaced forwardly from said impact bar and connected thereto.

4. An automobile bumper comprising parallel impact bars, separate spring supporting bars connected to said impact bars intermediate the ends and the center thereof and pivoted to said ends to support said bars, and an advance bar spaced forwardly from said impact bars and connected thereto.

5. An automobile bumper comprising an impact bar, separate spring supporting bars connected to said impact bar intermediate the ends and the center thereof and pivoted to said ends to support said bar, an advance bar spaced forwardly from said impact bar, and clamps connecting said advance bar to said impact bar.

6. An automobile bumper comprising parallel impact bars, separate spring supporting bars connected to said impact bars intermediate the ends and the center thereof and pivoted to said ends to support said bars, an advance bar spaced forwardly from said impact bars, and clamps connecting said advance bar to said impact bars.

7. An automobile bumper comprising two parallel spring impact bars spaced from each other, separate spring supporting bars connected to said impact bars intermediate the ends and the center thereof and pivoted to said ends to support said impact bars, and an advance spring bar arranged between and spaced forwardly from said impact bars.

8. An automobile bumper comprising two parallel spring impact bars spaced from each other, separate spring supporting bars connected to said impact bars intermediate the ends and the center thereof and pivoted to said ends to support said impact bars, and an advance spring bar arranged between and spaced forwardly from said impact bars and connected thereto.

9. An automobile bumper comprising two parallel spring impact bars spaced from each other, separate spring supporting bars connected to said impact bars intermediate the ends and the center thereof and pivoted to said ends to support said impact bars, an advance spring bar arranged between and spaced forwardly from said impact bars, and clamps connecting said advance bar to said impact bars.

10. An automobile bumper comprising a spring impact bar, spring supporting bars pivoted at the outer ends thereof to the ends of said impact bar and having the inner ends thereof looped and independently connected to said impact bar intermediate the ends and the center thereof to support the same, and an advance bar spaced forwardly from said impact bar.

11. An automobile bumper comprising parallel impact bars, spring supporting bars pivoted at the outer ends thereof to the ends of said impact bars and having the inner ends thereof looped and independently connected to said impact bars intermediate the ends and the center thereof to support the same, and an advance bar spaced forwardly from said impact bars.

12. An automobile bumper comprising a spring impact bar, spring supporting bars pivoted at the outer ends thereof to the ends of said impact bar and having the inner ends thereof looped and independently connected to said impact bar intermediate the ends and the center thereof to support the same, and an advance bar spaced forwardly from said impact bar and connected thereto.

13. An automobile bumper comprising parallel impact bars, spring supporting bars pivoted at the outer ends thereof to the ends of said impact bars and having the inner ends thereof looped and independently connected to said impact bars intermediate the ends and the center thereof to support the same, and an advance bar spaced forwardly from said impact bars and connected thereto.

14. An automobile bumper comprising a spring impact bar, spring supporting bars pivoted at the outer ends thereof to the ends of said impact bar and having the inner ends thereof looped and independently connected to said impact bar intermediate the ends and the center thereof to support the same, an advance bar spaced forwardly from said impact bar, and clamps connecting said advance bar to said impact bar.

15. An automobile bumper comprising parallel impact bars, spring supporting bars pivoted at the outer ends thereof to the ends of said impact bars and having the inner ends thereof looped and independently connected to said impact bars intermediate the ends and the center thereof to support the same, an advance bar spaced forwardly from said impact bars, and clamps connecting said advance bar to said impact bars.

16. An automobile bumper comprising two parallel spring impact bars spaced from each other, spring supporting bars pivoted at the outer ends thereof to the ends of said impact bars and having the inner ends thereof looped and independently connected to said impact bars intermediate the ends and the center thereof to support the same, and an advance bar arranged between and spaced forwardly from said impact bars.

17. An automobile bumper comprising two parallel spring impact bars spaced from each other, spring supporting bars pivoted at the outer ends thereof to the ends of said impact bars and having the inner ends thereof looped and independently connected to said impact bars intermediate the ends and the center thereof to support the same, an advance bar arranged between and spaced forwardly from said impact bars, and clamps connecting said advance bar to said impact bars.

18. An automobile bumper comprising parallel impact bars, separate springs supporting bars connected to said impact bars intermediate the ends and the center thereof and pivoted to said ends to support said impact bars, and an advance bar spaced forwardly from said impact bars and pivoted to the ends thereof.

19. An automobile bumper comprising parallel impact bars, separate spring supporting bars connected to said impact bars intermediate the ends and the center thereof and pivoted to said ends to support said impact bars, an advance bar spaced forwardly from said impact bars and pivoted to the ends thereof, and clamps connecting said advance bar to said impact bars.

20. An automobile bumper comprising two parallel spring impact bars spaced from each other, spring supporting bars pivoted at the outer ends thereof to the ends of said impact bars and having the inner ends thereof looped and independently connected to said impact bars intermediate the ends and the center thereof to support the same, a spring advance bar spaced forwardly from said impact bars and pivoted to the ends thereof, and clamps connecting said advance bar to said impact bars.

In witness whereof I have hereunto subscribed my name.

WILLIAM A. STARCK.